United States Patent
Drankhan et al.

[15] 3,663,806
[45] May 16, 1972

[54] APPARATUS FOR CALCULATING AND DISPLAYING DYNAMIC COIL PARAMETERS

[72] Inventors: Voit C. Drankhan, Hamburg; Frank Di Nicolantonio, Williamsville, both of N.Y.

[73] Assignee: Westinghouse Electric Corporation, Pittsburgh, Pa.

[22] Filed: Feb. 3, 1971

[21] Appl. No.: 112,228

[52] U.S. Cl.........................235/151.32, 235/151.1, 242/57, 242/75.51
[51] Int. Cl...............................................G06f 15/46
[58] Field of Search...........235/150.3, 151.1, 151.3, 151.32; 73/490–491; 33/141 B, 142; 242/57, 75.51

[56] References Cited

UNITED STATES PATENTS

| | | |
|---|---|---|
| 3,553,992 | 1/1971 | Harbaugh....................235/151.1 UX |
| 3,411,055 | 11/1968 | Carter et al....................242/75.51 X |
| 3,600,562 | 8/1971 | Di Nicolantonio et al........235/151.32 |
| 3,409,242 | 11/1968 | Kishioka..............................242/57 X |

*Primary Examiner*—Malcolm A. Morrison
*Assistant Examiner*—Jerry Smith
*Attorney*—F. H. Henson, R. G. Brodahl and James J. Wood

[57] ABSTRACT

This disclosure relates to a system for calculating and displaying coil parameters in a dynamic system in which material is being payed from a coil or reel.

10 Claims, 2 Drawing Figures

Patented May 16, 1972

WITNESSES:
Bernard R. Gieguay
James F. Young

INVENTORS
Voit C. Drankhan and
Frank DiNicolantonio
BY
James J. Wood
ATTORNEY

APPARATUS FOR CALCULATING AND DISPLAYING DYNAMIC COIL PARAMETERS

CROSS REFERENCES TO RELATED APPLICATIONS

See the copending application "Computer System for Determining the Stop Length Required to Arrest a Moving Strip of Material," Ser. No. 886,697 filed on Dec. 19, 1969 in the names of Frank DiNicolantonio, Voit Drankhan and Paul W. Wagener, now U.S. Pat. No. 3,600,562 and assigned to the same assignee as the instant invention.

BACKGROUND OF THE INVENTION

1. Field of the Invention

This invention relates to apparatus for calculating and displaying dynamic coil parameters.

2. Description of the Prior Art

As the description proceeds, it will be evident that the instant invention may be advantageously employed in any environment where the raw material is handled in large rolls such as in the paper, plastic and steel industries. For example, it is the practice in steel fabrication to use large coils of steel which may be 6 feet or more in diameter. It is highly desirable for the steel mill operator to know the various measurement parameters concerning the coil of material: what length he requires to stop the moving strip, whether he actually now has the requisite length of material available to come to a stop, how much material is left on the coil being payed out etc. Most prior art devices use analog techniques which require input information which, in practice, is frequently derived from manufacturer's specifications rather than from empirically derived data. Obviously such input data may produce spurious and even cumulative errors which can be distinctly disadvantageous in some applications.

SUMMARY OF THE INVENTION

The instant invention relates to apparatus for calculating parameters for a coil of material being payed out, the moving coil being approximated to a plurality of concentric circles. Means are provided for repeatedly measuring the incremental difference in circumference (D.C.) between at least two wraps of material. Means are also provided for summing these incremental differences, successively for 1,2,3,4, — $n$ times. Additionally, means are provided for determining the instantaneous actual circumference (A.C.) of the moving coil. Finally, means are provided for successively comparing the magnitudes of the actual circumference A.C. with $n$ D.C. to provide operational intelligence regarding the moving coil of material.

In another embodiment, the calculated actual circumference A.C. is visibly displayed in terms of the number of wraps remaining on the coil being payed out.

BRIEF DESCRIPTION OF THE DRAWINGS

For a better understanding of the invention, reference may be had to the exemplary embodiment shown in the accompanying drawings, in which.

THEORETICAL CONSIDERATIONS

Figure 1:
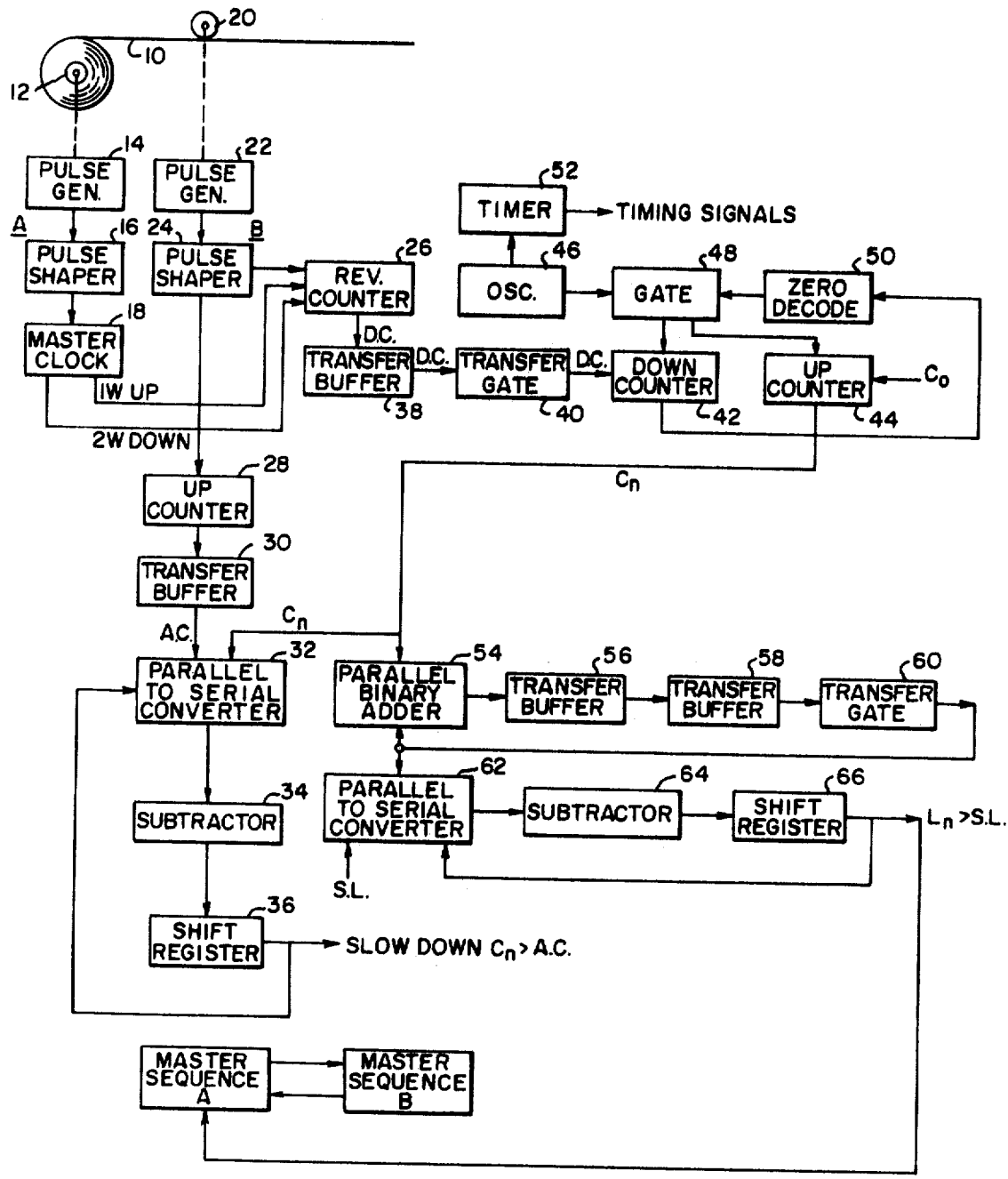
FIG. 1 is a block schematic showing the apparatus for calculating the dynamic coil parameters in accordance with one embodiment of the invention.

Before beginning a description of the invention proper, it will be helpful to consider the underlying theoretical concepts.

A coil of material wound upon a cylindrical means such as a mandrel, may be closely approximated to a plurality of concentric circles, each succeeding circle differing by some incremental diameter which will be defined as $\Delta d$. where $$\Delta d = \text{two times the thickness of the material} \quad (1)$$

Assume that some material is wound on a mandrel of diameter $d_o$. The circumference $C_o$ of the mandrel is $$C_o = \pi d_o \quad (2)$$

The first wrap on the mandrel has a circumference $C_1$ which is equal to the circumference of the mandrel plus the incremental circumference afforded by $\Delta d$ $$C_1 = C_o + \pi\Delta d = \pi d_o + \pi\Delta d \quad (3)$$

where $C_1$ = the circumference of the first wrap.

Similarly the successively larger circumferences $C_2$ and $C_3$ are:

$$C_2 = C_1 + \pi\Delta d \quad (4)$$
$$= \pi d_o + 2\pi\Delta d$$
$$C_3 = C_2 + \pi\Delta d \quad (5)$$
$$= \pi d_o + 3\pi\Delta d$$

This iterative formulation may be generalized:

$$C_n = \pi d_o + n\pi\Delta d \quad (6)$$

where $C_n$ = the circumference of the $n^{th}$ wrap $n$ = any integer 1,2,3, —, $n$.

Since, inter alia, we will be concerned with the total length for any number of wraps, it will be convenient to define these lengths by adding the circumferences of the successive wraps respectively. The length $L_o$ is defined as being equal to the mandrel circumference $$L_o = C_o = \pi d_o \quad (7)$$

The length $L_1$ of the first wrap is:

$$L_1 = L_o + C_1 \quad (8)$$
$$= \pi d_o + \pi d_o + \pi\Delta d$$
$$= 2\pi d_o + \pi\Delta d$$

The next lengths $L_2, L_3, L_4$ are:

$$L_2 = L_1 + C_2 \quad (9)$$
$$= 2\pi d_o + \pi\Delta d + \pi d_o + 2\pi\Delta d$$
$$= 3\pi d_o + 3\pi\Delta d$$
$$L_3 = L_2 + C_3 \quad (10)$$
$$= 3\pi d_o + 3\pi\Delta d + \pi d_o + 3\pi\Delta d$$
$$= 4\pi d_o + 6\pi\Delta d$$
$$L_4 = L_3 + C_4 \quad (11)$$
$$= 4\pi d_o + 6\pi\Delta d + \pi d_o + 4\pi\Delta d$$
$$= 5\pi d_o + 10\pi\Delta d$$

The total length of the $n^{th}$ wrap may be generalized:

$$L_n = (n+1)\pi d_o + \frac{(n)(n+1)}{2}\pi\Delta d \quad (12)$$

where $L_n$ = the total length of the material of $n$ wraps, and $n$ = any integer 1,2,3,4, — $n$.

The system for calculating and displaying dynamic coil parameter in accordance with this invention, makes liberal use of logic devices and component circuitry which are well known in the art, so that the description to follow will be directed in particular only to those elements forming part of or cooperating more directly with the instant invention. Additional elements, and/or functions not shown or described, shall be understood to be readily obtainable from commercially available sources, and/or alternatively selectable from techniques well known to those practicing in the art.

DESCRIPTION OF THE FIGURE 1 EMBODIMENT

Referring now to FIG. 1, a strip of material 10 is being payed from a coil which is mounted on a mandrel 12.

In its broadest sense, the invention makes use of two sensing means. A first sensing means indicated generally at A is mechanically coupled to the mandrel 12, and generates pulse signals for each wrap of material as the coil is payed off. An additional sensing means indicated generally at B is arranged to detect the length of strip material that passes a given reference point to determine $\Delta L$ defined in the mathematics above. The length of strip material that passes the reference point is then determined for one revolution of the coil as indicated by the sensing means A. This measured information is then stored, and represents the length of the outermost wrap. Utilizing the same method, the second wrap payed off is similarly measured, and this magnitude is then subtracted from the previously measured magnitude to give the difference $\Delta L$. The length $\Delta L$ can be used as a building block to determine the total length of strip on the coil. Further, the total number of wraps on the coil can be determined by counting the additions of $\Delta L$ required to get the total length.

In the embodiment of FIG. 1 a rotary pulse generator 14 generates a train of pulses for each rotation of the mandrel 12. The pulses generated are then sent to a pulse shaper 16 for squaring. These pulses are then applied to an up counter which becomes in effect a master clock 18. As will be explained more fully as the description proceeds, depending upon whether the two or four wrap technique is employed, clock 18 will count 1,2, 1,2, etc. or 1,2,3,4, 1,2,3,4, etc. respectively. The sensing means B in this particular embodiment, comprises a billy roll 20 which is coupled to a rotary pulse generator 22 which generates pulses in accordance with the length of strip that has passed a given reference point. The generated pulses are than passed through a pulse shaper 24, the output of which is applied as a train of pulses to a revolution counter 26, and to an up counter 28. The contents of the up counter 28 are applied successively to a transfer buffer 30, a parallel to serial converter 32, a subtractor 34 and a shift register 36. Similarly, the information from the revolution counter 26 is successively advanced to a transfer buffer 38, through a transfer gate 40 and to a down counter 42. An up counter is shown at 44. A free running oscillator identified at 46, develops a series of pulses which are applied to a counter which acts as a timer 52 which develops timing signals for the parallel to serial converters 32 and 62. The output of the oscillator 46 is controlled through a transfer gate 48, the gate in turn being under the discipline of master sequence A and a zero decode 50. The up counter 44 is applied to the parallel to serial converter 32 and to a parallel binary adder 54. The contents of the parallel binary adder 54 are applied to successively arranged transfer buffers 56 and 58 and then to a transfer gate 60. Completing the description, a parallel to serial converter is identified as 62, the information transfer being to a subtractor 64 and to a shift register 66. The entire system is under the control of master sequence A and master sequence B.

All of the components described by the captions within the box symbols are well known in the art. The counter is simply a device of the forward-backward type having the ability to add and subtract input, and thus capable of counting in either an increasing or decreasing direction; in the drawing such counters are denominated up and down counters, timers respectively depending upon their functional utilization. The transfer buffer is simply a register which temporarily stores information and permits its transfer at the proper time. The parallel to serial converter is a shift register used to enable binary intelligence in parallel form to be converted so that it may be handled serially. A shift register comprises interconnected flip flops, each flip flop storing a binary bit, and enabling the stored intelligence to be shifted one place to the left or right upon the application of a shift pulse; it is used to perform multiplication or division, and to convert serial data to parallel data or vice versa. The master sequences A and B are programmed signals to permit operations to be performed in order in a desired predetermined sequence.

DESCRIPTION OF THE FIGURE 2 EMBODIMENT

Figure 2:
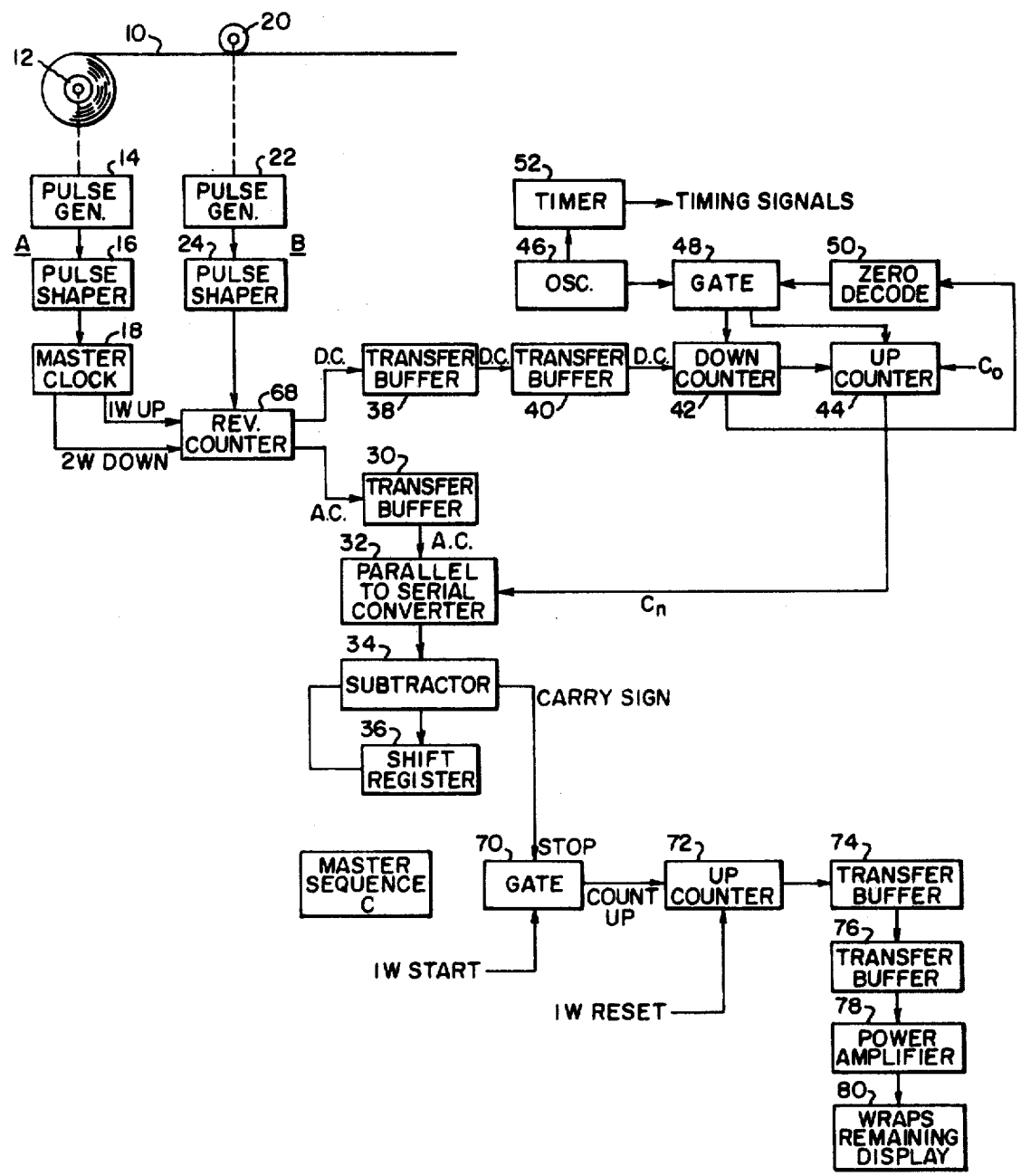
FIG. 2 is a block schematic of the apparatus for displaying the wraps remaining on the coil of material in accordance with another embodiment of the invention.

The circuitry of FIG. 2 is similar to that shown in FIG. 1 and therefore the same numeration has been used for similar components. Where the unit or component is functionally different, a new identification has been assigned. The pulses generated by generator 22, and reshaped by the pulse shaper 24 are applied to a revolution counter 68.

A master sequence C controls the operation of FIG. 2. From the gate 70, the signal transfer is up to a counter 72, and thence to transfer buffers 74 and 76. The output of the transfer buffer 76 is applied successively to a power amplifier 78 and a wraps remaining display 80, which is an electronic digital display.

OPERATION OF THE EMBODIMENT OF FIGURE 1

Assume that a mill operator desires to arrest the strip 10 at a preselected deceleration time, the strip being payed out at a predetermined mill speed. The stopping length (S.L.) is calculated, that is, for the selected parameters how much material is required to safely stop the coil. The S.L. may be determined in any convenient manner or it may be advantageously calculated in accordance with the teaching of the copending application "Computer System for Determining the Stop Length Required to Arrest a Moving Strip of Material," Ser. No. 886,697, filed on Dec. 19, 1969 in the names of Frank DiNicolantonio, Voit Drankhan and Paul W. Wagener, now U.S. Pat. No. 3,600,562, and assigned to the same assignee as the instant invention.

The stopping length S.L. may be expressed as a number of pulses, for example 5,350 pulses which is a function of the number of feet required to stop the moving strip of material. This is applied in binary form to the parallel to serial converter 62 as indicated at S.L. in FIG. 1. The circumference $C_o$ of the mandrel 12 is arbitrarily equated to a number of pulses and applied to the up counter 44.

The overall plan of operation is as follows:

The system is under the discipline of master sequences A and B. The free running oscillator 46 generates a series of pulses which are sent to the timer 52 which develops timing signals for the parallel to serial converters 32 and 62. The master sequences A and B, provide gating signals for the various components. All the transfer buffers for example are operated by gating signals. Master sequence A first initiates a comparison between S.L. and $L_n$. If $L_n <$ S.L., the calculations are repeated and a new comparison is made. If $L_n >$ S.L., master sequency A actuates master sequence B which initiates the comparison between $C_n$ and the actual circumference A.C. Every two or four wraps (depending upon which technique is utilized) the master sequence B switches back to master sequence A until $C_n \geq$ A.C., at which time a signal is sent to slow down the mill.

Assume that the two wrap technique is utilized and that master sequence A is actuated. The billy roll 20 riding along the material 10, by means of the pulse generator 22 generates a series of pulses the number of which are a function of the length of material that has passed. These pulses after shaping are applied to the revolution counter 26. In the time sequence provided by the signals from clock 18, the counter 26 is arranged to successively count up for one wrap and then down for the second wrap so that what remains is the difference (D.C.) or $\pi \Delta d$; this is applied to transfer buffer 38 for temporary storage. At the proper time, when transfer gate 40 is enabled, this information will be transferred to down counter 42.

The pulses from the oscillator 46 are blocked by gate 48. Upon a signal from the master sequence A, gate 48 is opened, and a gating signal is sent to down counter 42 and to up counter 44. Down counter 42 begins to count down and up counter 44 begins to count up. The process continues until the zero decode 50 detects a binary zero in the down counter 42. Zero decode 50 then sends a blocking signal shutting off the gate 48. The result is that the down counter 42 contains a binary 0 and counter 44 contains the original information $C_o + \pi \Delta d$. From equation 3 it may be observed that this is $C_1$ i.e. $C_n = C_1$. This is applied to the parallel binary adder 54 and to the parallel to serial converter 32. Transfer gate 60 is now opened by master sequence A and the contents of transfer buffer 58 are applied to parallel binary adder 54 and to the parallel to serial converter 62. (The transfer buffer 58 contains $L_o$ which is transferred from up counter 44. Note: $L_o = C_o$ equation 7.) Thus the difference $\pi \Delta d$ is being added to the contents of up counter 44, transferred to parallel binary adder 54 where it is added to whatever is in transfer buffer 58. Thus $L_1$ is calculated and then successively $L_2 L_3 \longrightarrow L_n$.

The parallel to serial converter 62 converts the binary information from parallel to serial form. The information in the practical embodiment being described was in 24 bits so the parallel to binary converter handles the information 4 bits at a time so that in all six operations are performed. The subtractor 64 performs subtraction on $L_n$ and S.L. The actual results of the subtraction are not of interest—the actual problem is to determine whether the numbers are equal or greater and hence the only interest is in the binary carry. Arbitrarily, it is arranged so that if the shift register 66 has a carry equal to ZERO S.L. is $>L_n$, and if it has a carry equal to binary ONE, then $L_n >$ S.L. Thus when the carry ONE appears, $L_n>$S.L. and the system has determined that there is a length of material greater than the stopping length. A carry signal to master sequence A, stops these operations, and master sequence A initiates master sequence B.

It has already been described how the signals from the billy roll 20 are transferred to the revolution counter 26. However, it will be noted from a study of FIG. 1 that these same signals are also applied to up counter 28 which contains counts which are a function of the instantaneous circumference of the coil. The output of the up counter 44 is also applied to the parallel to serial converter 32. The up counter 28 continuously counts pulses as a function of the instantaneous circumference, and dumps it into the transfer buffer 30. Up counter 28 is then reset. However, nothing happens until the master sequence B actuates the transfer buffer 30. The contents of transfer buffer 30 are then applied to the parallel to serial converter 32. When the master sequence B is initiated by master sequence A, the output of the up counter 44 i.e. $C_n$, is actually the calculated stopping circumference where $n$ may be any number consonant with the preselected deceleration time. The problem is now to compare the actual circumference A.C. with the stopping circumference $C_n$. The converter 32 subtractor 34 and shift register 36 function similarly to converter 62 subtractor 64 and register 66. The shift register 36 is arbitrarily arranged so that a carry ZERO indicates that the actual circumference A.C. is $>C_n$ and calculations should continue. The successive subtractions are continued for two wraps and if a carry ONE is not developed the operations are switched again to master sequence A. If a carry ONE is indicated, a slow down signal is sent to slow the mill down. The mill operator will then jog the material remaining on the mandrel 12 into the mill rolls.

The calculations performed under the discipline of master sequence A are repeated (although they could be retained) because in the interim, the operator may change conditions requiring the calculation of a new stopping circumference. Of course if nothing is changed, the next calculation will be of the same magnitude. Since the calculations can be made so quickly it is safer to repeat them.

Note: In one practical embodiment the four wrap technique is used rather than the two wrap technique to provide an averaging effect for greater accuracy. For example, the counter 26 is arranged to count up for two wraps and down for two wraps so that what remains is the difference D.C. $= 4\pi\Delta d$. Thus instead of calculating $L_1, L_2 - L_n$, the system calculates $L_1, L_{ah} \cdot L_8, - L_n$.

OPERATION OF THE EMBODIMENT OF FIGURE 2

The operation of the FIG. 2 embodiment is similar to that of FIG. 1. The FIG. 2 embodiment seeks to count the number of times that $C_n$ is compared with A.C. and in that manner keep track of the number of wraps remaining on the coil. When A.C., the actual circumference, is equal to $C_n$, it is then known how many wraps A.C. contains because it is known how many times $\pi\Delta d$ (two wrap technique) or $4\pi\Delta d$ (four wrap technique) has been added in calculating $C_n$.

The sequencing of the operations of the FIG. 2 system is under the discipline of master sequence C.

The master clock 18 provides the time sequence up one wrap, down the second wrap, or up one to two wraps down three to four wraps. At the initiation of the cycle $1w$, gate 70 is enabled and signals sent from the master sequence C (which includes a ring counter) start the up counter 72 counting up; during the next wrap ($2w$) the counter will count down one count. The counter 72 is reset at $1w$.

The revolution counter 68 counts up for $1w$ time. Transfer buffer 30 is gated on and the information is transferred to buffer 30; this is the actual circumference A.C. Next the revolution counter 68 is counted down for $2w$ time. Transfer buffer 38 is then gated on and the difference D.C. or $\pi\Delta d$ is then transferred to transfer buffer 38. The up counter 44 handles the difference intelligence D.C. in exactly the same way as in FIG. 1. The calculated circumference $C_n$ is then applied to the parallel to serial converter 32. The subtractor 34 performs the operation of subtraction on $C_n$ and A.C. If $C_n <$A.C., indicated by a binary zero carry sign, the steps are repeated. If $C_n >$A.C. the carry sign develops a binary ONE. A STOP signal is sent to gate 70 and up counter 72 stops. The master sequence C enables transfer buffers 74 and 76 to receive the accumulated counts in up counter 72, which is then reset. The output of transfer buffer 76 operates a power amplifier 78 which in turn energizes the wraps remaining display 80.

It will therefore be apparent that there has been disclosed apparatus of universal applicability for calculating and displaying dynamic coil parameters where the material to be handled is arranged on a coil or reel.

What we claim is:

1. Apparatus for calculating parameters for a coil of material being payed out, the moving coil being approximated to a plurality of concentric circles, comprising:
    means for successively measuring the incremental difference in circumference (D.C.) between at least two wraps of material;
    means for summing the said incremental difference in the circumference (D.C.) successively for 1,2,3, — $n$ times;
    means for determining the instantaneous actual circumference (A.C.) of the moving coil of material; and
    means for successively comparing the magnitudes of A.C. with $n$ D.C. to provide operational intelligence regarding the moving coil.

2. Apparatus according to claim 1 wherein:
    said means for measuring the incremental difference in circumference (D.C.) is determined by subtracting the smaller circumference from the larger circumference of two successive wraps.

3. Apparatus according to claim 1 wherein said means for measuring the incremental difference in circumference (D.C.) is determined by summing the circumferences of two successive wraps and subtracting from this summation, the sum of the next two successive wraps, the arithmetic process being repeated in the recited sequence.

4. Apparatus according to claim 1 wherein said means for determining the instantaneous actual circumference (A.C.) comprises:
    means for continuously generating a train of pulses as a function of the length of material being payed out;
    means for receiving and converting said pulse train intelligence into binary form;
    means for storing said binary intelligence; and
    means for rewriting said stored binary intelligence into said storing means, in sequence to and as a function of the successive measurement of said incremental difference in circumference (D.C.).

5. Apparatus according to claim 1 including means for determining when the length of material being payed out ($n$ D.C.) is greater than a predetermined stopping length (S.L.) based on operating conditions.

6. Apparatus according to claim 5 wherein said means for determining when $n$ D.C. > S.L. comprises:
    means for subtracting (S.L.) from $n$ D.C. in binary serial form to provide successive remainders; and
    register means for receiving said successive remainders, a binary carry ONE being indicative that $n$ D.C.>S.L.

7. Apparatus according to claim 5 including:
    means for developing an initiate signal when $n$ D.C.>S.L.;
    means for receiving said initiate signal to initiate the comparison between $n$ D.C. and A.C.

8. Apparatus according to claim 1 including:
    means for digitally counting in time sequence up and down to the successive measurement of said incremental circumference (D.C.); and means for developing an arresting signal to stop said digital counting means when $n$ D.C. > A.C.

9. Apparatus according to claim 8 including:

means coupled to said digital counting means for displaying the accumulated count when $n$ D.C. > A.C.

10. Apparatus according to claim 1 wherein the means for summing said incremental difference in circumference performs the operation:

$$C_n = \pi d_o + n\pi \Delta d,$$

where
- $C_n$ = the circumference of the $n^{th}$ wrap,
- $d_o$ = the diameter of the mandrel upon which the material is wound,
- $n$ = any integer 1,2,3,---$n$, and
- $\Delta d$ = two times the thickness of the material.

* * * * *